United States Patent
Sun

(10) Patent No.: US 12,027,973 B2
(45) Date of Patent: Jul. 2, 2024

(54) MULTI-PHASE VOLTAGE REGULATOR AND TEMPERATURE MONITORING METHOD THEREOF

(71) Applicant: Shanghai Bright Power Semiconductor Co., Ltd., Shanghai (CN)

(72) Inventor: Shun-Gen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 481 days.

(21) Appl. No.: 17/383,594

(22) Filed: Jul. 23, 2021

(65) Prior Publication Data

US 2022/0103064 A1    Mar. 31, 2022

(30) Foreign Application Priority Data

Sep. 30, 2020  (CN) .......................... 202011070110.7

(51) Int. Cl.
   *H02M 3/04*  (2006.01)
   *G01K 1/02*  (2021.01)
   *G01K 7/00*  (2006.01)

(52) U.S. Cl.
   CPC .............. *H02M 3/04* (2013.01); *G01K 1/026* (2013.01); *G01K 7/00* (2013.01)

(58) Field of Classification Search
   CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H02M 2003/1566; H02M 2003/1557; H02M 2001/0012; H02M 2001/0009; H02M 2001/385; H04B 2215/069
   See application file for complete search history.

(56) References Cited

U.S. PATENT DOCUMENTS

2011/0002358 A1 * 1/2011 Sato .................. H01L 23/34
                                            374/163

* cited by examiner

*Primary Examiner* — Bryan R Perez
(74) *Attorney, Agent, or Firm* — Muncy, Geissler, Olds & Lowe, P.C.

(57) ABSTRACT

The present invention relates to a multi-phase voltage regulator and a temperature monitoring method thereof. The method includes the following steps of: step 1a: providing a multi-phase voltage regulator including a controller and a plurality of power stages, wherein the controller transmits a corresponding control signal to each of the plurality of power stages, each of the plurality of power stages including a temperature sampling unit, outputs of the temperature sampling units connected to the controller and in parallel with each other; Step 1b: performing time-sharing signal exchange with the temperature sampling unit of the power stages; and Step 1c: when the controller exchanges signals with the temperature sampling unit of a certain power stage, the temperature sampling unit transmits an output signal representing the temperature thereof to the controller via the output.

15 Claims, 5 Drawing Sheets

MULTI-PHASE VOLTAGE REGULATOR AND TEMPERATURE MONITORING METHOD THEREOF

FIELD OF THE INVENTION

The present invention relates to a voltage regulator, in particular to a multi-phase voltage regulator and a temperature monitoring method thereof.

BACKGROUND OF THE INVENTION

As semiconductor technology continues to evolve, for example, computers and peripheral digital products have updated. In the integrated circuits of computers and peripheral digital products, due to the rapid development of semiconductor technology, more diversified requirements of integrated circuit power supply are made. Voltage regulators of various topologies, such as step-up converter, step-down converters and so on, are used to achieve different power supply requirements of various integrated circuits, and become one of the important factors whether diversified digital products can be provided.

In various voltage regulation circuits, multi-phase voltage regulators have good performance in high current or high power applications. However, due to the inconsistency of the layout and design of the multi-phase power supply or deviations in parameters of components, the temperature of each phase may be different when the power supply works. That is, the condition that the temperature of some phases are lower than other phases exists, so that the reliability of the multi-phase power supply is reduced and the power output capacity of the multi-phase power supply is limited. Therefore, real-time temperature monitoring of a multi-phase voltage regulator is an urgent problem to be solved.

SUMMARY OF THE INVENTION

The present invention provides a temperature monitoring method of a multi-phase voltage regulator, which can effectively monitor the temperature.

The present invention further provides a multi-phase voltage regulator which can effectively monitor the temperature.

Other objects and advantages of the present invention can be further understood from the technical features disclosed herein.

The present invention discloses a temperature monitoring method of a multi-phase voltage regulator, comprising the following steps of:

step 1a: providing a multi-phase voltage regulator, wherein the multi-phase voltage regulator comprises a controller and a plurality of power stages, the controller transmits a plurality of control signals to the plurality of power stages via a control terminal corresponding to each power stage, and wherein each of the plurality of power stages comprises a temperature sampling unit, outputs of the plurality of temperature sampling units connected in parallel with each other and connected to the controller;

step 1b: exchanging a signal with each of the plurality of power stages by the controller in a time-sharing manner; and step 1c: when the controller exchanges the signal with one of the plurality of power stages, transmitting an output signal representing a temperature corresponding to the power stage to the controller via the corresponding control terminal of the power stage.

In an embodiment of the present invention, in step 1b, the controller pulls up voltage levels of the outputs of the plurality of temperature sampling units which are connected in parallel, and if one of the plurality of power stages detects that the control signal thereof and the output of the temperature sampling unit are both of high voltage level, the controller starts to exchange the signal.

In an embodiment of the present invention, in the step 1b, when the control signal correspondingly output by the controller generates a rising edge, the voltage levels of the outputs of the plurality of temperature sampling units connected in parallel are synchronously pulled up.

In an embodiment of the present invention, in step 1c, the output signal representing the temperature corresponding to one of the plurality of power stages comprises a pulse width modulation signal having a pulse width related to the temperature of the power stage.

In an embodiment of the present invention, in step 1c, the output signal representing the temperature corresponding to one of the plurality of power stages comprises a pulse width modulation signal, and a number of pulses of the pulse width modulation signal during a period of the controller exchanging signal with the corresponding power stage relates to the temperature of the power stage.

In an embodiment of the present invention, in the step 1b, when the controller pulls up the voltage levels of the outputs of the plurality of temperature sampling unit of the plurality of power stages connected in parallel, only one of the plurality of power stages receives the control signal of high voltage level.

In an embodiment of the present invention, after the controller collects the output signals representing the temperatures of the plurality of power stages, the controller further adjusts the control signal corresponding to the plurality of power stages according to the output signal so that the temperatures of the plurality of power stages approach the same.

In an embodiment of the present invention, in the plurality of power stages, the voltage levels of the outputs of the plurality of temperature sampling units are kept in high voltage level during the controller exchanging the signals with the plurality of power stages.

The multi-phase voltage regulator of the present invention comprises: a controller; and a plurality of power stages. The controller transmits a control signal to a control terminal of each of the plurality of power stages, and each of the plurality of power stages comprises a temperature sampling unit, outputs of the plurality of temperature sampling units connected in parallel with each other and connected to the controller. The controller exchanges a signal with each of the plurality of power stages in a time-sharing manner, and when the controller exchanges the signal with one of the plurality of power stages, the power stage transmits an output signal representing a temperature corresponding to the power stage to the controller via the control terminal thereof.

In an embodiment of the present invention, the controller pulls up voltage levels of the outputs of the plurality of temperature sampling units; if one of the plurality of power stages detects that the control signal thereof and the output of the temperature sampling unit thereof are both of high voltage level, the power stage starts to exchange the signal with the controller.

In an embodiment of the present invention, when the control signal correspondingly output by the controller generates a rising edge, the voltage levels of the outputs of the plurality of temperature sampling units connected in parallel are synchronously pulled up.

In an embodiment of the present invention, the output signal representing the temperature corresponding to one of the plurality of power stage comprises a pulse width modulation signal having a pulse width related to the temperature of the power stage.

In an embodiment of the present invention, the output signal representing the temperature corresponding to the power stage comprises a pulse width modulation signal, and a number of pulses of the pulse width modulation signal during a period of the controller exchanging signal with the corresponding power stage relates to the temperature of the power stage.

In an embodiment of the present invention, the output signal comprises a count value which is obtained by counting the number of pulses of the pulse width modulation signal, and the count value relates to the temperature of one of the plurality of power stages.

In an embodiment of the present invention, when the controller pulls up the voltage levels of the outputs of the plurality of temperature sampling units of the plurality of power stages connected in parallel, only one of the plurality of power stages receives the control signal of high voltage level.

In an embodiment of the present invention, after the controller collects the output signals representing the temperatures of the plurality of power stages, the controller adjusts the control signal corresponding to the plurality of power stages according to the output signals so that the temperatures of the plurality of power stages approach the same.

In an embodiment of the present invention, in the plurality of power stages, the voltage levels of the outputs of the plurality of temperature sampling units are kept in high voltage level during the controller exchanging the signals with the plurality of power stages.

In the multi-phase voltage regulator and the temperature monitoring method thereof provided by the present invention, by arranging a controller and a plurality of power stages, the temperature sampling units of the plurality of power stages are connected to the controller in parallel. The controller performs a time-sharing signal exchange with each of the plurality of power stages, so that the controller can obtain the signals representing the temperature of each of the plurality of power stages and adjust the control signal of corresponding power stage. The reliability of the multi-phase voltage regulator is greatly improved. The multi-phase voltage regulator of the present invention can fully utilize the power output capability of the multi-phase power supply and simultaneously improve the reliability of the multi-phase power supply.

DETAILED DESCRIPTION OF THE PREFERRED EMBODIMENTS

The foregoing and other technical contents, features and effects of the present invention will be apparent from the following detailed description of a preferred embodiment with reference to the accompanying drawings.

When an element is referred to as being "connected" or "coupled" to another element, the element may be connected or coupled to the other element directly or through intervening elements. Additionally, it should be understood that the order of description of the various embodiments should not be construed to imply that the operations or steps must be order dependent, and that alternative embodiments may perform the steps, operations, methods, etc. in an order other than that described herein.

Figure 1:
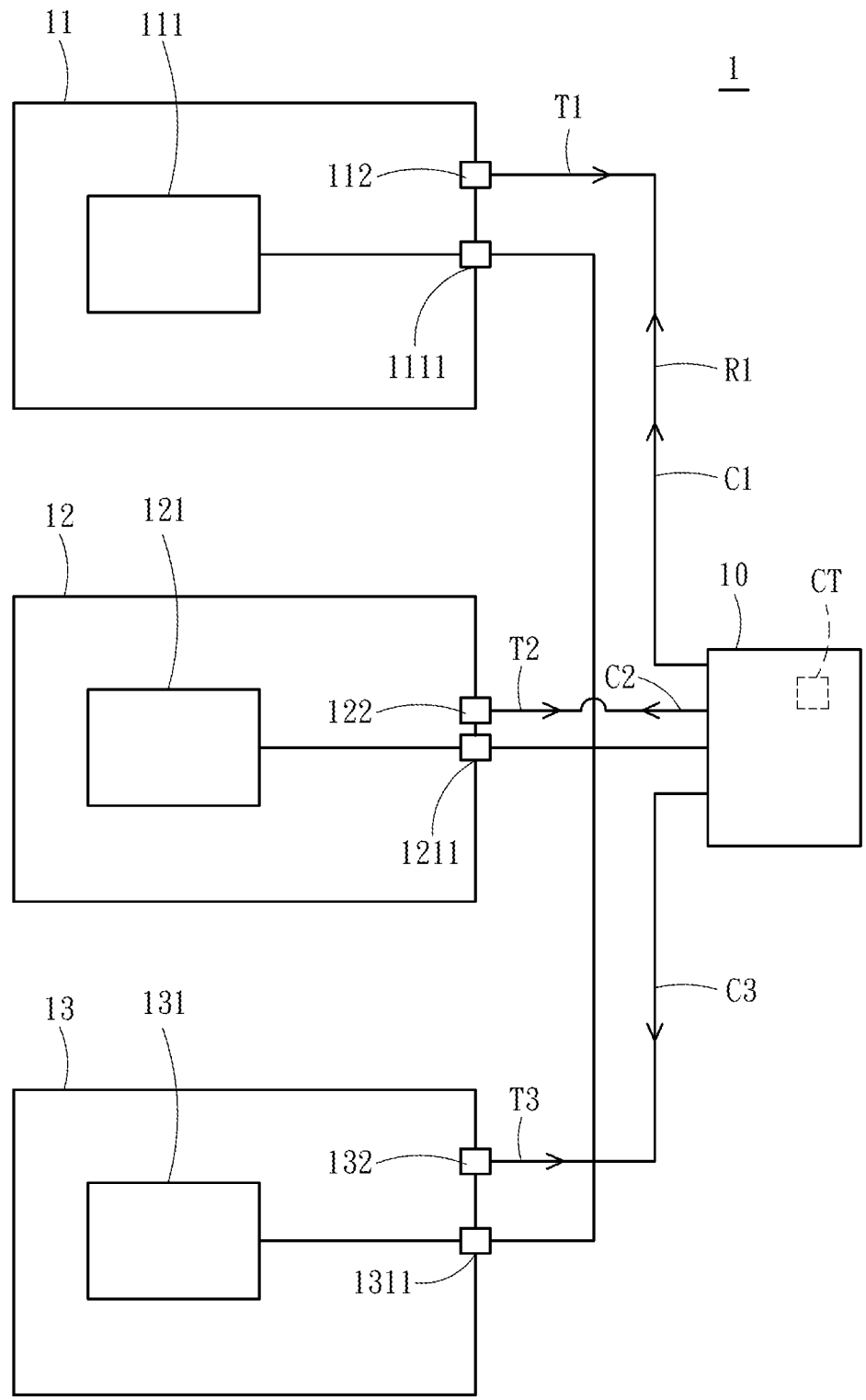
FIG. 1 is a schematic diagram of a multi-phase voltage regulator according to an embodiment of the present invention.

With reference to FIG. 1, there is shown a schematic diagram of a multi-phase voltage regulator 1 according to an embodiment of the present invention. The multi-phase voltage regulator 1 includes a controller 10 and a plurality of power stages 11, 12, 13. The present invention is not limited regarding the number of the plurality of power stages included in the multi-phase voltage regulator. This embodiment illustrates that the multi-phase voltage regulator 1 includes three power stages 11, 12, 13. The controller 10 transmits a plurality of control signals C1, C2, C3 to a plurality of control terminals 112, 122, 132 corresponding to the plurality of power stages 11, 12, 13, respectively. The plurality of power stages 11, 12, 13 include a plurality of temperature sampling units 111, 121, 131, respectively. Outputs 1111, 1211, 1311 of the plurality of temperature sampling units 111, 121, 131 are connected in parallel with each other and connected to the controller 10 via a joint point.

In this embodiment, the plurality of control signals C1, C2, C3 received by the plurality of power stages 11, 12, 13 are not synchronized, i.e. different in phase. In other embodiments, the control signals C1, C2, C3 may also be synchronized, i.e. with the same phase.

Figure 2:
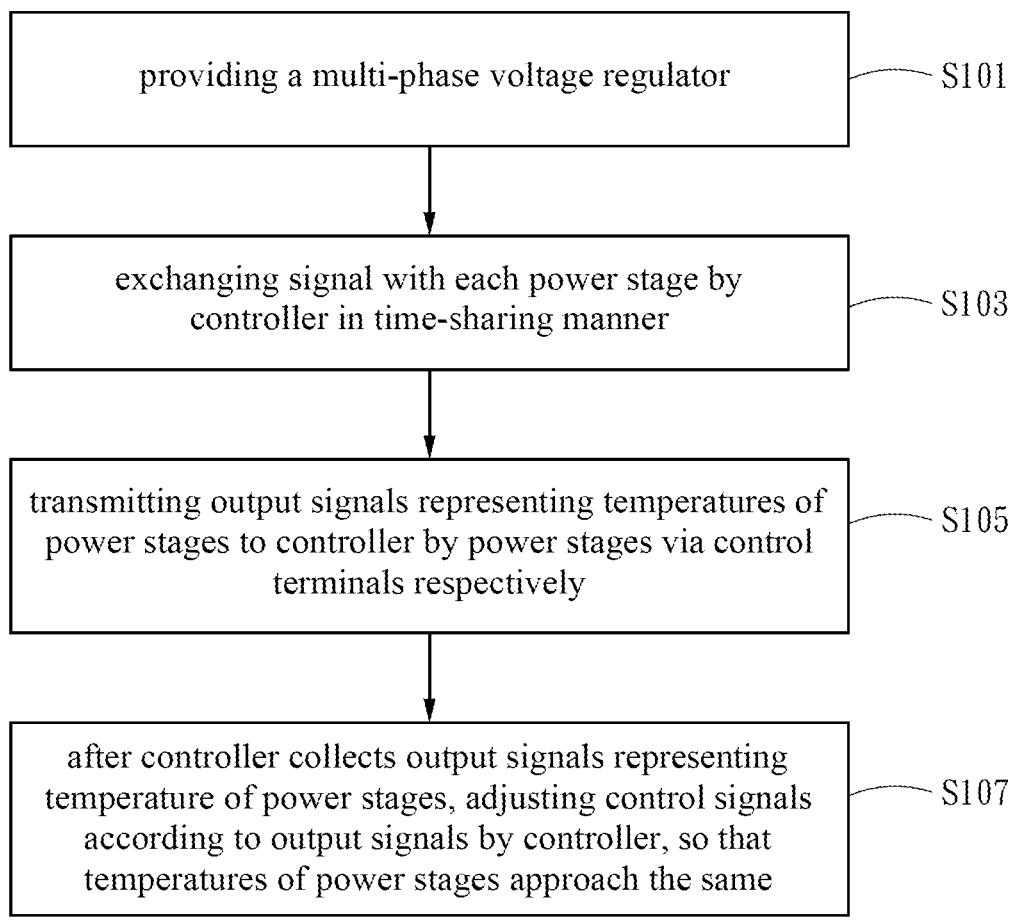
FIG. 2 is a flowchart of a temperature monitoring method of a multi-phase voltage regulator according to an embodiment of the present invention.

With reference to FIG. 2, which is a flowchart of a temperature monitoring method 100 of a multi-phase voltage regulator 1 according to an embodiment of the present invention. In step S101, the multi-phase voltage regulator 1 as shown in FIG. 1 is provided. Next, in step S103, the controller 10 exchanges a signal with each of the plurality of power stages 11, 12, 13 in a time-sharing manner.

Specifically, in step S105, the plurality of power stages 11, 12, 13 transmit output signals T1, T2, T3 representing the temperatures corresponding to the plurality of power stages 11, 12, 13 to the controller 10 via the plurality of control terminals 112, 122, 132, respectively. For example, the power stage 11 transmits the output signal T1 representing the temperature corresponding to the power stage 11 to the controller 10 via the control terminal 112. The present invention is not limited on the form in which the plurality of output signals T1, T2, T3 represent temperature of corresponding power stages. The plurality of output signals T1, T2, T3 represent the temperature in the form of, for example, the number of pulses or the pulse width of the pulse signal, which will be described in detail in the embodiments of FIG. 4 and FIG. 6.

In this embodiment, the plurality of power stages 11, 12, 13 report the temperature of the plurality of power stages 11, 12, 13 to the controller 10 in time-sharing manner Thereby, the controller 10 can obtain the temperature of the plurality of power stages 11, 12, 13 to take corresponding actions such as over-temperature protection and/or temperature equalization control, greatly improving the reliability of the multi-phase voltage regulator 1.

In an embodiment of the present invention, step S107 is performed after step S105. In step S107, after the controller 10 collects the plurality of output signals T1, T2, T3 representing the temperature of each of the plurality of power stages 11, 12, 13, the controller 10 adjusts the plurality of control signals C1, C2, C3 according to the plurality of output signals T1, T2, T3, so that the temperatures of the plurality of power stages 11, 12, 13 approach the same. Therefore, the plurality of power stages 11, 12 and 13 can effectively achieve temperature equalization, and the reliability of the multi-phase voltage regulator 1 is greatly improved.

The present invention is not limited in the manner in which the controller 10 adjusts the temperature of the plurality of power stages 11, 12, 13. For example, the controller 10 may control some of the plurality of power stages 11, 12, 13 by means of pulse width modulation (PWM) signals, so that some of the plurality of power stages 11, 12, 13 output more current, and the temperature thereof gradually rises, with the temperature of all the plurality of power stages 11, 12, 13 tending to be consistent.

Figure 3:
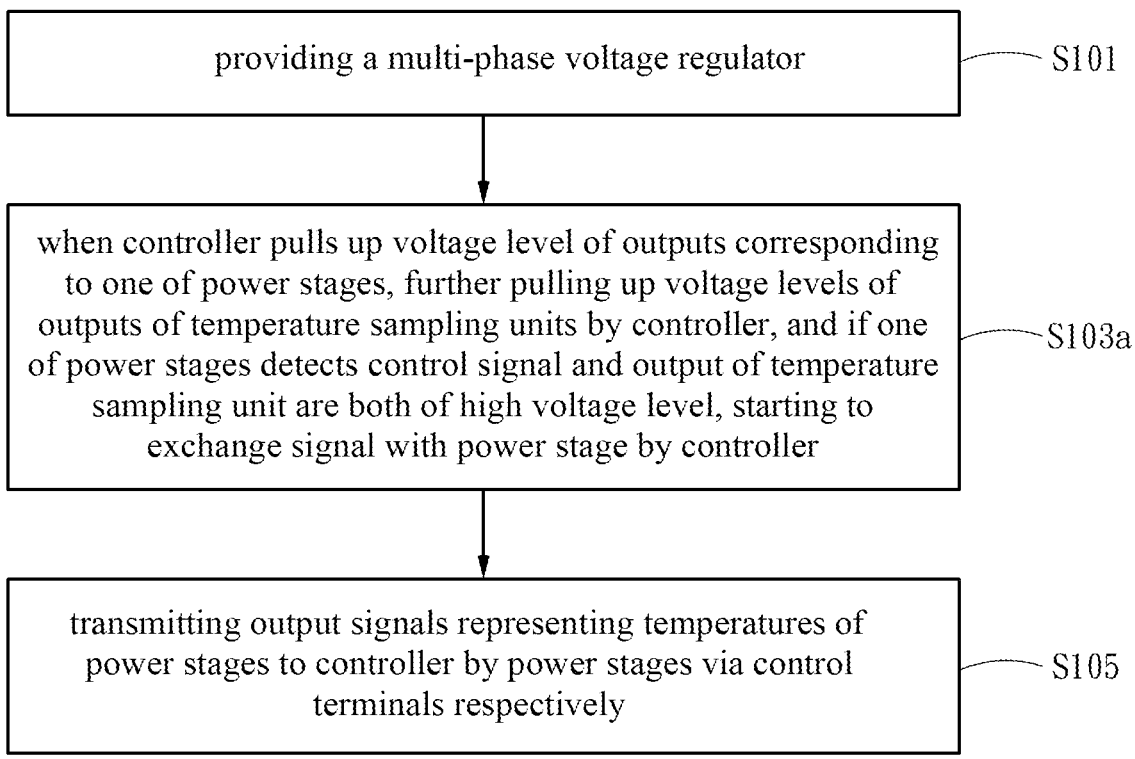
FIG. 3 is a flowchart of a temperature monitoring method of a multi-phase voltage regulator according to another embodiment of the present invention.

With reference to FIG. 3, a flowchart of a temperature monitoring method 200 of a multi-phase voltage regulator 1 according to another embodiment of the present invention is shown. The temperature monitoring method 200 of the embodiment has a similar function to the temperature monitoring method 100 shown in FIG. 2, and the embodiment differs from the embodiment shown in FIG. 2 by: in step S103a, the controller 10 further pulling up the voltage levels of the plurality of outputs 1111, 1211, 1311 of the temperature sampling units 111, 121, 131, i.e. signals T1, T2, T3; if one of the plurality of power stages, for example power stage 11 detects that the control signal C1 and the output T1 of the temperature sampling unit are both of high voltage level, the controller starts to exchange the signal with power stage 11. That is, when the controller 10 is to perform temperature monitoring, the voltage level of the output of the temperature sampling unit is actively pulled up, and when the power stage detects that the control signal and the output of the temperature sampling unit are both of high voltage level, the controller starts to enter a temperature monitoring mode and exchanges signals with the power stage.

Figure 4:
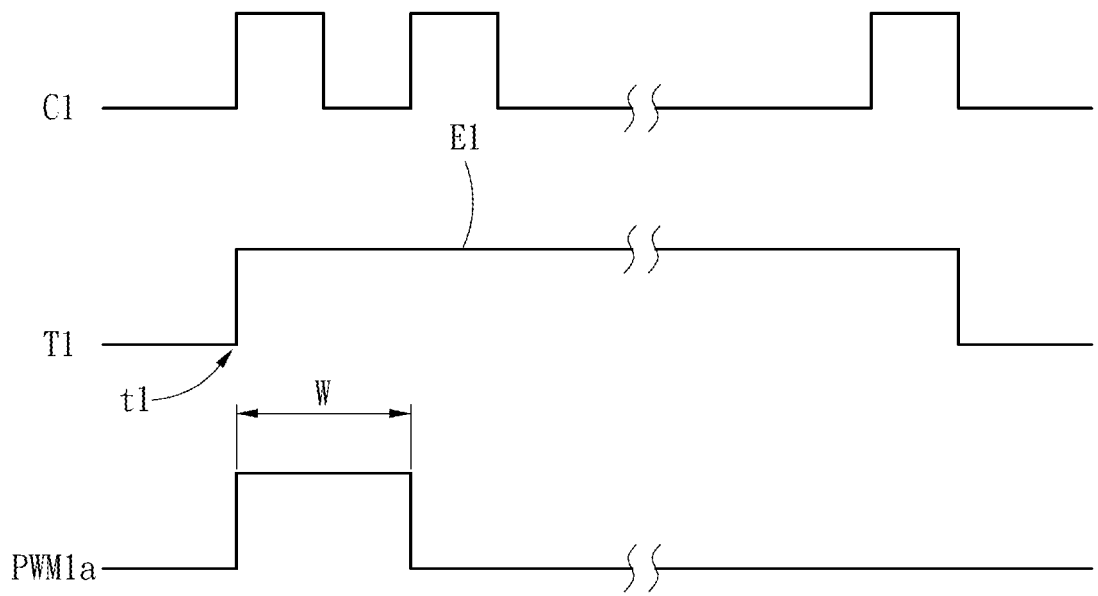
FIG. 4 is a schematic diagram of a multi-phase voltage regulator according to another embodiment of the present invention.

With reference to FIG. 4, FIG. 4 is a schematic diagram of a multi-phase voltage regulator according to another embodiment of the present invention. For example, as shown in FIG. 4, at time point ti, the controller 10 actively pulls up the voltage level of the output 1111 of the temperature sampling unit 111 corresponding to the power stage 11. When the power stage 11 detects that the control signal C1 and the output 1111 of the temperature sampling unit 111 are both of high voltage level, a signal exchange is started.

Thereby, the controller 10 can actively initiate a temperature monitoring request according to which the power stage 11 can enter the temperature monitoring mode and report its temperature to the controller.

In an embodiment of the present invention, in step S103a, when the controller 10 pulls up the voltage level of the plurality of outputs 1111, 1211, 1311 of the plurality of temperature sampling units 111, 121, 131 corresponding to one of the plurality of power stages 11, 12, 13, the method further includes: the controller 10 outputs the control signal with a rising edge to the corresponding power stage. For example, when the rising edge arrives, the controller synchronously pulls up the voltage level of the output of the temperature sampling unit of the corresponding power stage 11.

Further, after the temperature monitoring is completed, the controller 10 may pull down the voltage level of the plurality of outputs 1111, 1211, 1311 of the plurality of temperature sampling units 111, 121, 131. The temperature monitoring of the plurality of power stages 11, 12, 13 is ended thereby.

Figure 5:
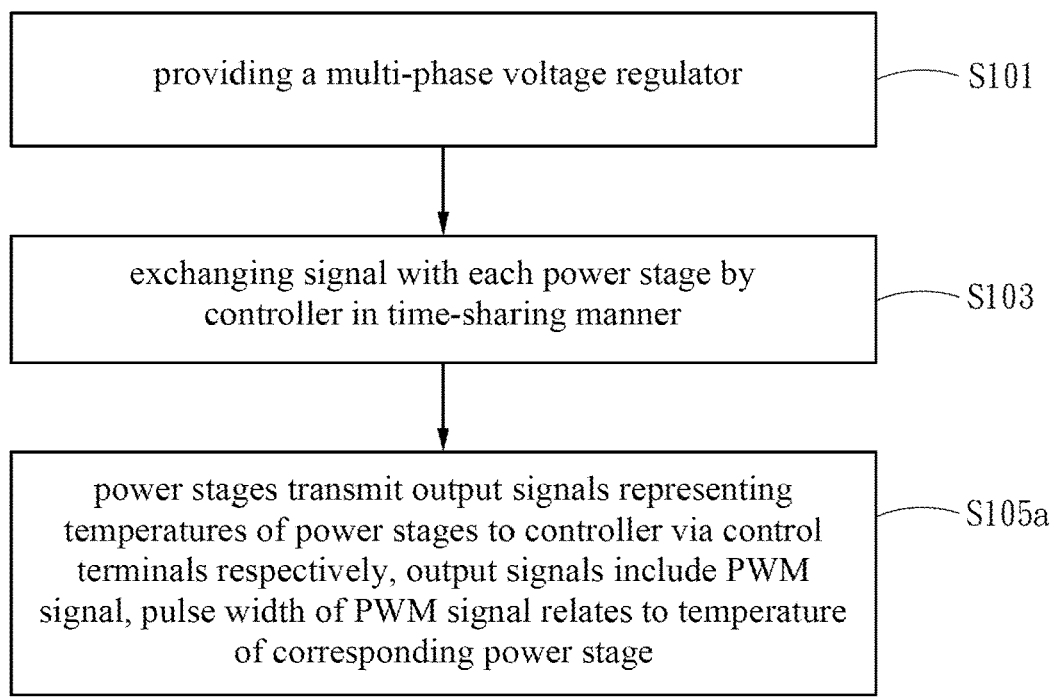
FIG. 5 is a flowchart of a temperature monitoring method of a multi-phase voltage regulator according to yet another embodiment of the present invention.

With reference to FIG. 5, a flowchart of a temperature monitoring method 300 of a multi-phase voltage regulator 1 according to yet another embodiment of the present invention is shown. The temperature monitoring method 300 of the embodiment has a similar function to the temperature monitoring method 100 shown in FIG. 2, and this embodiment differs from the embodiment shown in FIG. 2 by: in step S105a, the output signals T1, T2, T3 representing the temperature corresponding to the plurality of power stages 11, 12, 13 further include a pulse width modulation (PWM) signal. The pulse width of the pulse width modulation signal relates to the temperature of the corresponding one of the power stages 11, 12, 13.

With reference to FIG. 4, for example, as shown in FIG. 4, after entering the temperature monitoring mode, the output signal T1 representing the temperature of the power stage 11 includes a pulse width modulation signal PWM1a. A pulse width W of the pulse width modulation signal PWM1a corresponds to the temperature of the power stage 11. For example, the larger the pulse width W, the higher the temperature; the smaller the pulse width W, the lower the temperature. Thereby, the controller 10 can obtain the temperature of the power stage 11 according to the pulse width.

Figure 7:
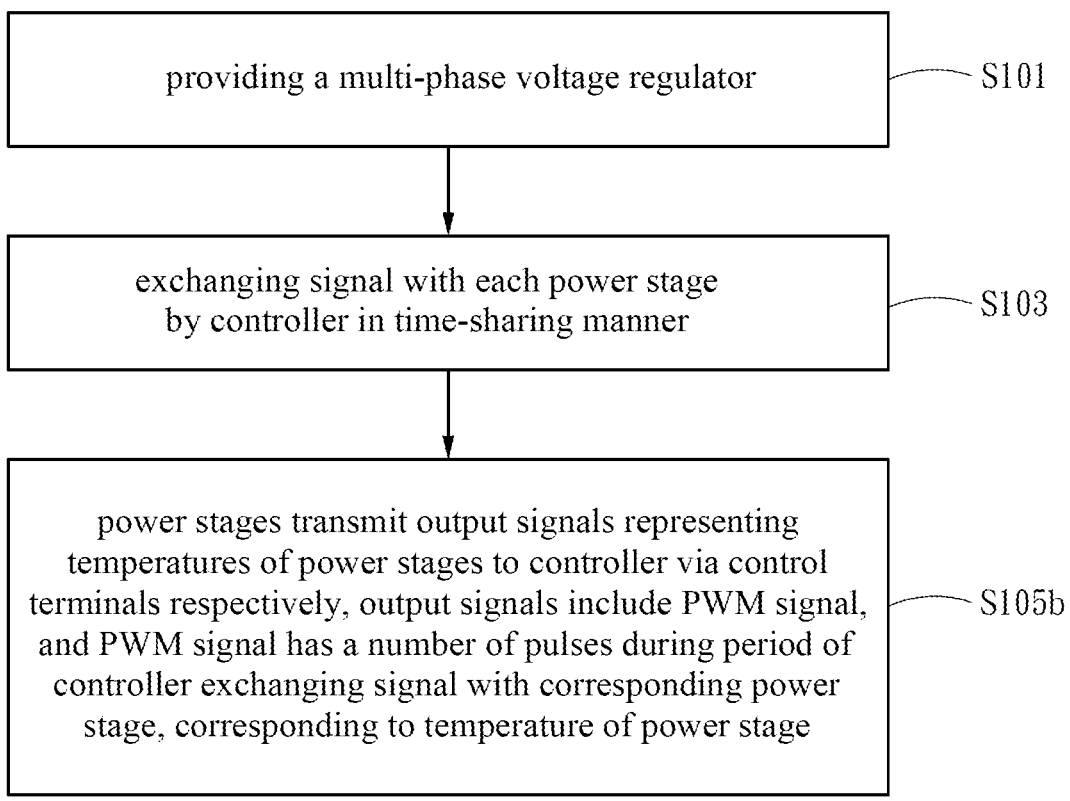
FIG. 7 is a flowchart of a temperature monitoring method of a multi-phase voltage regulator according to yet another embodiment of the present invention.

With reference to FIG. 7, a flowchart of a temperature monitoring method 500 of a multi-phase voltage regulator 1 according to yet another embodiment of the present invention is shown. The temperature monitoring method 500 of the embodiment has a similar function to the temperature monitoring method 100 shown in FIG. 2, and the embodiment differs from the embodiment shown in FIG. 2 by: in step S105b, the output signals T1, T2, T3 representing the temperature corresponding to the plurality of power stages 11, 12, 13 further include a pulse width modulation signal. The pulse width modulation signal has a number of pulses during a period of the controller 10 exchanging signal with the corresponding power stage 11, 12, 13 (i.e. the temperature monitoring mode), corresponding to the temperature of the power stage 11, 12, 13.

Figure 6:
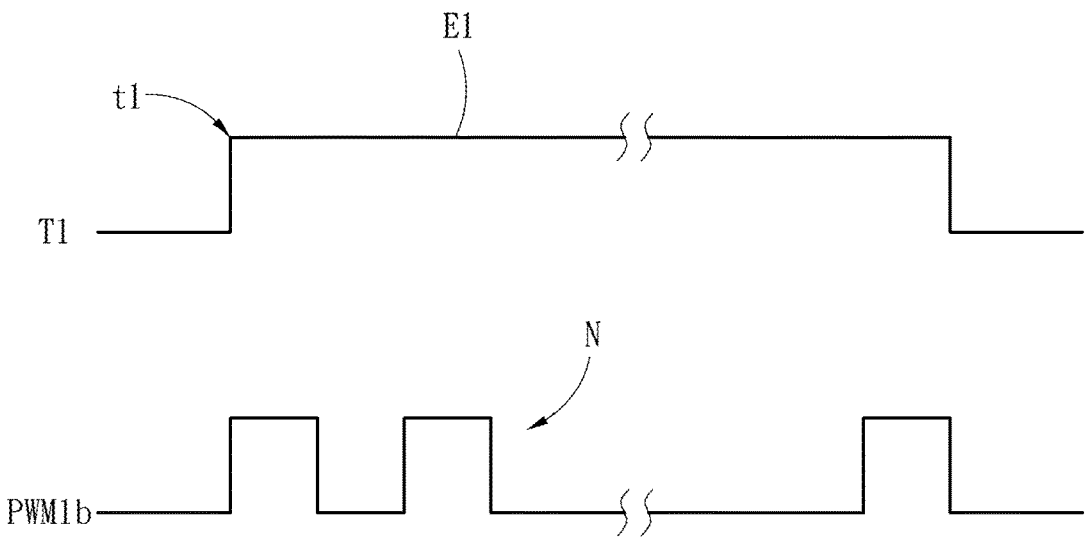
FIG. 6 is a schematic diagram of a multi-phase voltage regulator according to yet another embodiment of the present invention.

With reference to FIG. 6, for example, the output signal T1 representing the temperature corresponding to the power stage 11 includes a pulse width modulation signal PWM1b. The number of pulses of the pulse width modulation signal PWM1b during the period of the controller 10 exchanging signal with the corresponding power stage 11 is N (as shown in FIG. 6), and the number of pulses N relates to the temperature of the power stage 11. For example, each pulse in the pulse width modulation signal PWM1*b* may represent 5° C. and N pulses may represent 5×N° C. Thereby, the controller 10 can obtain the temperature of the power stage 11 according to the number of pulses.

In an embodiment of the present invention, each of the plurality of power stages 11, 12, 13 may further include a counter (not shown) which may count the number of pulses of the pulse width modulation signal to obtain the temperature of each of the plurality of power stages 11, 12, 13.

In an embodiment of the present invention, the controller 10 may further include an integrated counter CT (shown in FIG. 1) that counts the number of pulses of the pulse width modulation signal PWM1*b* to obtain the temperature of the power stage 11.

In summary, the present invention provides a multi-phase voltage regulator and a temperature monitoring method thereof, including a controller and a plurality of power stages, wherein temperature sampling units of the plurality of power stages are connected in parallel with each other and connected to the controller. The controller exchanges a signal with each of the plurality of power stages in a time-sharing manner, so that the controller can obtain the temperature of each of the plurality of power stages to carry out over-temperature protection, or to effectively achieve temperature equalization among the plurality of power stages, greatly improving the reliability of the multi-phase voltage regulator. The multi-phase voltage regulator can fully utilize the power output capability of the multi-phase power supply and simultaneously improve the reliability of the multi-phase power supply.

What is claimed is:

1. A temperature monitoring method of a multi-phase voltage regulator, comprising the following steps of: step 1a: providing a multi-phase voltage regulator, wherein the multi-phase voltage regulator comprises a controller and a plurality of power stages, the controller transmits a plurality of control signals to the plurality of power stages via a control terminal corresponding to each power stage, and wherein each of the plurality of power stages comprises a temperature sampling unit, outputs of the plurality of temperature sampling units connected in parallel with each other and connected to the controller; step 1b: exchanging a signal with each of the plurality of power stages by the controller in a time-sharing manner, wherein the controller pulls up voltage levels of the outputs of the plurality of temperature sampling units which are connected in parallel, and when one of the plurality of power stages detects that the control signal thereof and the output of the temperature sampling unit are both of high voltage level, the controller starts to exchange the signal; and step 1c: when the controller exchanges the signal with one of the plurality of power stages, transmitting an output signal representing a temperature corresponding to the power stage to the controller via the control terminal of the power stage.

2. The temperature monitoring method according to claim 1, wherein the step 1b, when the control signal correspondingly output by the controller generates a rising edge, the voltage levels of the outputs of the plurality of temperature sampling units connected in parallel are synchronously pulled up.

3. The temperature monitoring method according to claim 1, wherein in step 1c, the output signal representing the temperature corresponding to one of the plurality of power stages comprises a pulse width modulation signal having a pulse width related to the temperature of the power stage.

4. The temperature monitoring method according to claim 1, wherein in step 1c, the output signal representing the temperature corresponding to one of the plurality of power stages comprises a pulse width modulation signal, and a number of pulses of the pulse width modulation signal during a period of the controller exchanging signal with the corresponding power stage relates to the temperature of the power stage.

5. The temperature monitoring method according to claim 1, wherein in the step 1b, when the controller pulls up the voltage levels of the outputs of the plurality of temperature sampling units of the plurality of power stages connected in parallel, only one of the plurality of power stages receives the control signal of high voltage level.

6. The temperature monitoring method according to claim 1, wherein the controller further adjusts the control signal corresponding to the plurality of power stages according to the output signals after the controller collects the output signals representing the temperatures of the plurality of power stages, so that the temperatures of the plurality of power stages approach the same.

7. The temperature monitoring method according to claim 1, wherein in the plurality of power stages, the voltage levels of the outputs of the plurality of temperature sampling units are kept in high voltage level during the controller exchanging the signals with the plurality of power stages.

8. A multi-phase voltage regulator, comprising: a controller; and a plurality of power stages, wherein the controller transmits a control signal to a control terminal of each of the plurality of power stages, and each of the plurality of power stages comprises a temperature sampling unit, outputs of the plurality of temperature sampling units connected in parallel with each other and connected to the controller, wherein the controller exchanges a signal with each of the plurality of power stages in a time-sharing manner, wherein the controller pulls up voltage levels of the outputs of the plurality of temperature sampling units; when one of the plurality of power stages detects that the control signal thereof and the output of the temperature sampling unit thereof are both of high voltage level, and the power stage starts to exchange the signal with the controller, and when the controller exchanges the signal with one of the plurality of power stages, the power stage transmits an output signal representing a temperature corresponding to the power stage to the controller via the control terminal thereof.

9. The multi-phase voltage regulator according to claim 8, wherein the output signal representing the temperature corresponding to the power stage comprises a pulse width modulation signal, and a number of pulses of the pulse width modulation signal during a period of the controller exchanging signal with the corresponding power stage relates to the temperature of the power stage.

10. The multi-phase voltage regulator according to claim 9, wherein the output signal comprises a count value which is obtained by counting the number of pulses of the pulse width modulation signal, and the count value relates to the temperature of one of the plurality of power stages.

11. The multi-phase voltage regulator according to claim 8, wherein when the control signal correspondingly output by the controller generates a rising edge, the voltage levels of the outputs of the plurality of temperature sampling units connected in parallel are synchronously pulled up.

12. The multi-phase voltage regulator according to claim 8, wherein the output signal representing the temperature corresponding to one of the plurality of power stage comprises a pulse width modulation signal having a pulse width related to the temperature of the power stage.

13. The multi-phase voltage regulator according to claim 8, wherein only one of the plurality of power stages receives the control signal of high voltage level when the controller pulls up the voltage levels of the outputs of the plurality of temperature sampling units of the plurality of power stages connected in parallel.

14. The multi-phase voltage regulator according to claim 8, wherein the controller adjusts the control signals corresponding to the plurality of power stages according to the output signals after the controller collecting the output signals representing the temperatures of the plurality of power stages so that the temperatures of the plurality of power stages approach the same.

15. The multi-phase voltage regulator according to claim 8, wherein in the plurality of power stages, the voltage levels of the outputs of the plurality of temperature sampling units are kept in high voltage levels during the controller exchanging the signals with the plurality of power stages.

* * * * *